UNITED STATES PATENT OFFICE.

MICHEL NICHOLAS D'ANDRIA, OF STRETFORD, ENGLAND.

PROCESS OF MAKING MAGNESIUM HYDRATE.

SPECIFICATION forming part of Letters Patent No. 539,889, dated May 28, 1895.

Application filed January 16, 1895. Serial No. 535,058. (No specimens.) Patented in England December 21, 1893, No. 24,563.

*To all whom it may concern:*

Be it known that I, MICHEL NICHOLAS D'ANDRIA, a citizen of the United Kingdom of Great Britain and Ireland, residing at Stretford, in the county of Lancaster, England, have invented certain new and useful Improvements in the Manufacture of Magnesium Hydrate, of which the following is a specification.

This invention, for which I have obtained British Letters Patent No. 24,563, dated December 21, 1893, relates to the manufacture or production of magnesium hydrate, and is based on the fact that lime is soluble in water in the presence of a sufficient quantity of the latter, or by repeated immersions, while magnesia is practically insoluble, and upon the additional fact that lime will precipitate magnesia from a neutral or alkaline solution.

My object is to reduce the cost of the magnesium hydrate, and for this purpose I employ as the source, or one of the sources of the magnesia, calcined dolomite, and preferably such dolomite as is richest in magnesia and which, generally contains lime and magnesia in the proportions of three parts of the former to two parts of the latter. The separation of the magnesia is effected by copious treatment with water, which will dissolve out the lime and leave the magnesia practically undissolved; but, since relatively enormous quantities of water would thus be required, and since this water would often require to be pumped, I employ the natural flow of water and prefer to proceed in the following manner, which enables me to take advantage of marine tides and provides me with an additional source of magnesia.

At any suitable point at or near the seashore, or in a tidal estuary, I construct or arrange large tanks into which the tide can flow if permitted, and I provide such tanks with controllable outlets. The dolomite is first calcined and slaked, preferably with fresh water, and is then placed in the bottom of the tanks. The sea or tidal water is then admitted so as to fill or partly fill the tanks, and the contents are then stirred up and allowed to subside. The supernatant water is then allowed to drain off through the outlets, carrying some of the lime in solution and, possibly, calcium and magnesium hydrate in suspension but in such small quantities as not to practically lessen the advantages of the method. This is repeated until all or nearly all the hydrate of lime is dissolved out, when the residue will be found to consist mainly of magnesium hydrate. The dolomite may obviously be supplied to the tanks as a "milk" produced by slaking the calcined dolomite with a large excess of water. In either case, owing to the before mentioned fact that the magnesium base contained in the sea or other water is precipitated by the lime of the dolomite, I add this magnesium to my tank residue as hydrate and thus obtain a very appreciable advantage.

Where sea water is not available, and sufficient supplies of fresh water can be obtained under sufficient head to avoid pumping, I may make use of the fresh water in substantially the same manner as described for sea water.

If it be desired to remove any lime which may still be found in the sediment at the close of the operation, there may be added a sufficiency of dilute hydrochloric acid to combine with the lime. The sediment is then heated and agitated to produce the complete conversion of the lime into soluble chloride, which may be removed by decantation, washing or filtration. If at the same time some of the magnesia be brought into solution, or a solution of a magnesium salt be added, the reaction is made more certain.

When the process is carried out with water containing magnesium salts in solution, such as sea water, the hydrate of magnesium obtained from the dissolved salts becomes mixed with and carried down by the heavier magnesia obtained from the dolomite, and it is this fact which renders my process of great value and especially applicable for use with water containing magnesium salts in solution.

Should it be found that, owing to the presence of bicarbonate of lime or other soluble carbonates, or from the presence of carbon dioxid in the water, carbonate of lime would be present in the residue, I may prevent this by submitting the water to a preliminary treatment by adding thereto in a separate tank, a sufficiency of milk of lime to bring down the carbon dioxid. The ultimate residue consists almost wholly of magnesium hydrate and may be washed, dried and packed for the market or be used in the preparation of other magnesium salts as may be preferred.

I desire it to be understood that I do not limit myself to the precise hereinbefore described means and processes for the production of the magnesium hydrate as it is obvious that they may be variously modified to suit local conditions.

Having now particularly described and ascertained the nature of my said invention and in what manner the same is to be performed, I declare that what I claim is—

1. The method of treating calcined and slaked dolomite substantially as herein described, consisting in subjecting it to the action of water, agitating the mixture, then allowing the solids to subside, then decanting, and repeating these steps until the residue consists mainly of magnesium hydrate.

2. The method of obtaining magnesium hydrate, consisting in subjecting calcined and slaked dolomite to the repeated action of tide water, agitating the mixture, and allowing the solids to subside, and decanting the solution after each subsidence.

In testimony that I claim the foregoing as my invention I have signed my name, in presence of two witnesses, this 2d day of January, 1894.

MICHEL NICHOLAS D'ANDRIA.

Witnesses:
WILLIAM E. HEYES,
ARTHUR W. PULMAN.